(No Model.) 3 Sheets—Sheet 1.

G. MAYER.
FOLDING BABY CARRIAGE.

No. 554,072. Patented Feb. 4, 1896.

WITNESSES:
Paul Johet
Isaac D. Owens

INVENTOR
G. Mayer
BY
Munn & Co.
ATTORNEYS.

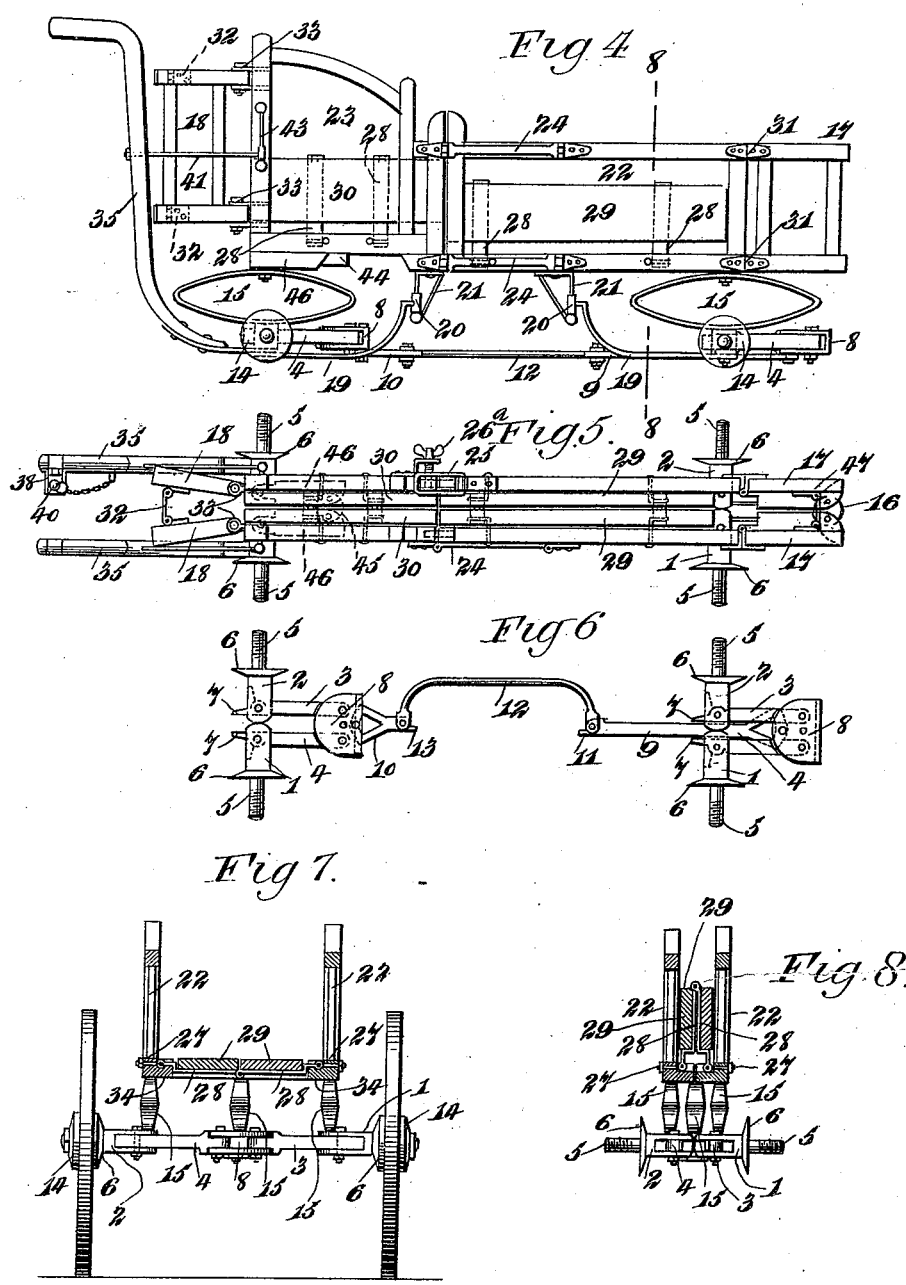

(No Model.) 3 Sheets—Sheet 3.
G. MAYER.
FOLDING BABY CARRIAGE.
No. 554,072. Patented Feb. 4, 1896.
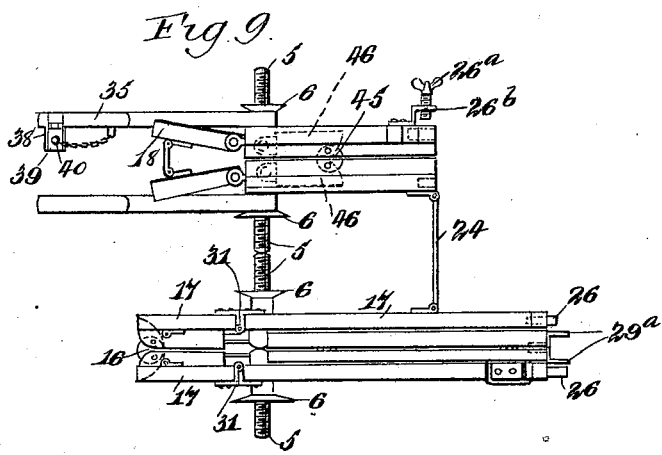
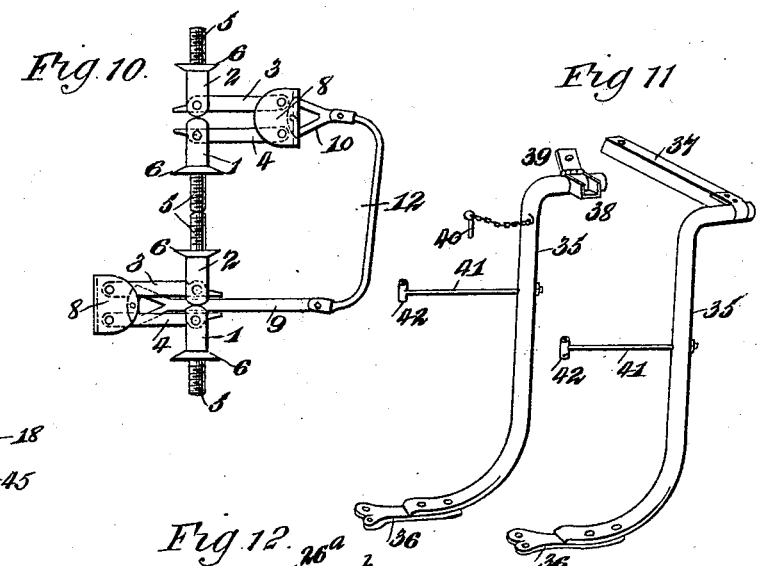
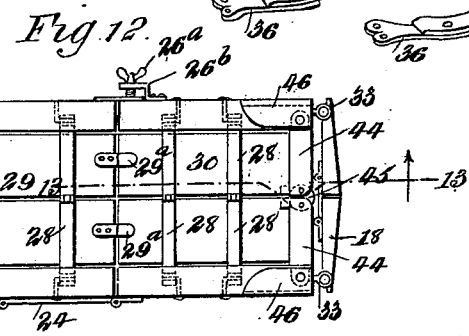
WITNESSES:
Paul Joel
Isaac B. Owens
INVENTOR
G. Mayer
BY
Munn & Co
ATTORNEYS.

UNITED STATES PATENT OFFICE.

GEORGE MAYER, OF NEW YORK, N. Y.

FOLDING BABY-CARRIAGE.

SPECIFICATION forming part of Letters Patent No. 554,072, dated February 4, 1896.

Application filed September 12, 1895. Serial No. 562,284. (No model.)

*To all whom it may concern:*

Be it known that I, GEORGE MAYER, of New York city, in the county and State of New York, have invented a new and Improved Folding Baby-Carriage, of which the following is a full, clear, and exact description.

The object of the invention is to provide a baby-carriage which may be folded both longitudinally and laterally.

Other objects are contemplated, all tending to the production of a device simpler in construction and easier in operation than those heretofore made.

To these ends the invention consists in certain peculiar features of construction and combinations of parts, which will be described hereinafter, and finally embodied in the claims.

Reference is to be had to the accompanying drawings, forming a part of this specification, in which similar characters of reference indicate corresponding parts in all the figures.

Figure 1:
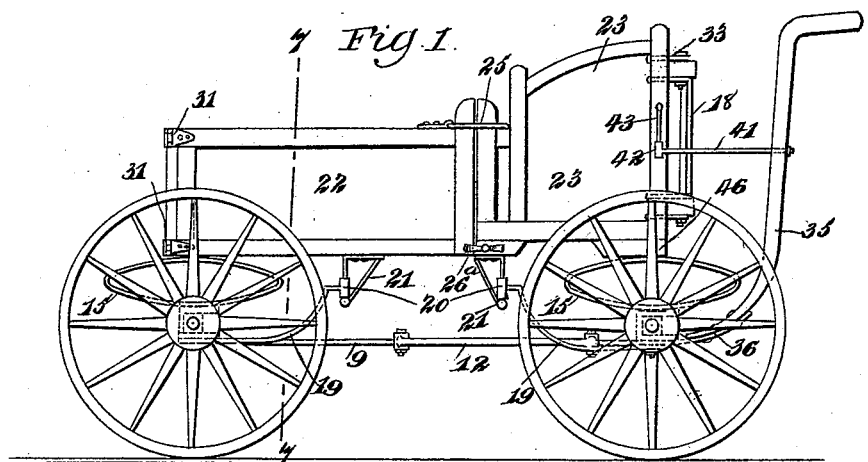
Figure 2:
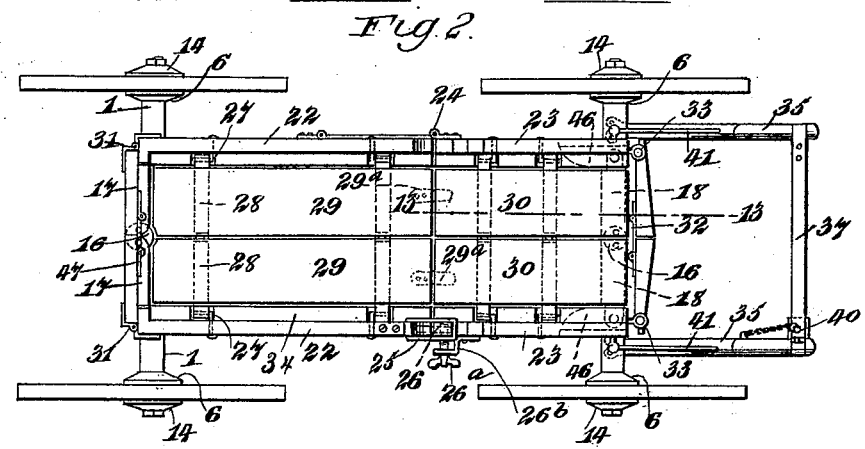
Figure 3:
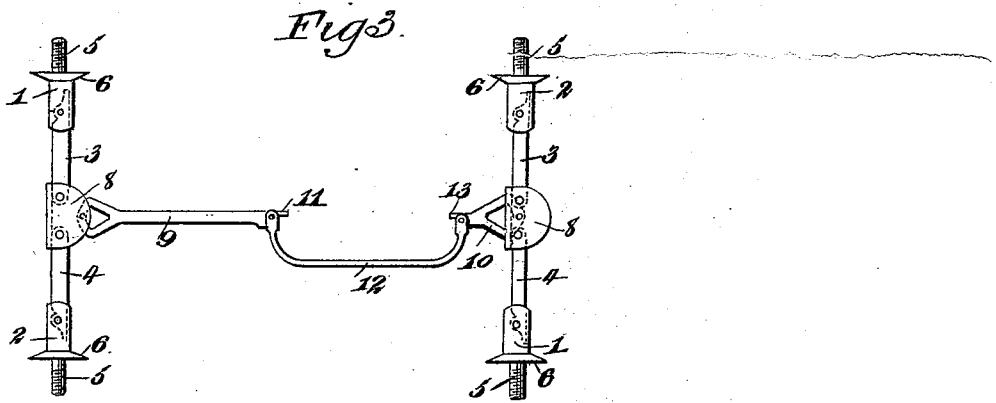

Figure 1 is a side elevation of the baby-carriage, showing the same completely extended for use. Fig. 2 is a plan view of the same. Fig. 3 is a plan view of the axle and coupling in extended position. Fig. 4 is a side elevation of the carriage when partially folded. Fig. 5 is a plan view thereof. Fig. 6 is a plan view of the axles and coupling, showing them partially folded. Fig. 7 is a cross-section on the line 7 7 of Fig. 1. Fig. 8 is a cross-section on the line 8 8 of Fig. 4. Fig. 9 is a plan view of the carriage completely folded. Fig. 10 is a plan view of the axles and coupling also completely folded. Fig. 11 is a perspective view of the handles detached and separated. Fig. 12 is a bottom plan view of the carriage-body detached from the running-gear, and Fig. 13 is a partial longitudinal section on the line 13 13 in Fig. 2.

In carrying out my invention each axle comprises four members, 1, 2, 3 and 4, the members 1 and 2 being end members and comprising the spindles 5 and hub-flanges 6, and having recessed inner ends between which the outer ends of the sections 3 and 4 are respectively pivoted, said sections 3 and 4 having projections 7, which are received in corresponding recesses in the sections 1 and 2, and by which the axles are prevented from excessive swinging movement when extended, as shown in Fig. 3. The inner ends of the sections 3 and 4 of each axle are pivotally mounted within a recess in the respective blocks 8, said blocks having also connected thereto the end sections 9 and 10 of the axle-coupling. The section 9 of the axle-coupling is the forward section, and is of a length approximately equal to one-half the distance between the axles, and has at its inner end a shoulder 11, adapted to bind against the intermediate section, 12, when the axle is folded, as shown in Fig. 10. The axle-section 10 is the rear section, and is also formed with a shoulder 13, in turn adapted to bind against the intermediate section, 12, as the axles and their couplings are folded to the position shown in Fig. 10. The section 10 is quadrant-shaped, as shown, and is fixed immovably to its respective block 8, while the section 9 is pivoted in place.

The wheels of the carriage are mounted on the spindles 5 and are provided with shortened hubs, upon the outer faces of which are held the respective disks 14, the inner faces having the disks 6 respectively bearing against them. By means of these disks the wheels are braced from wabbling movement and made to run evenly, the object of this construction being to avoid the lateral extension of the hubs.

Mounted on each outer section 1 and 2 of the axles and on each of the blocks 8 is an elliptical spring 15, said springs having their upper portions secured to the under side of the carriage-body, as will be now described. Each outer spring is rigidly secured to the side portions of the carriage-body, the front pair directly and the rear pair to the respective blocks 46, which are in turn secured to the carriage-body. The front central spring is bolted to a disk 16, said disk being pivotally connected to the bottom of the hinged front end portions 17 of the carriage-body, said end portions 17 being connected by a hinge 47, and when the body swings in the operation of folding the hinged sections 17 will move outwardly from the center of the carriage and carry with them the forward block, 8, of the axle, movement being communicated through the medium of the central front spring. It will be observed that the end sections 1 and 2 of each axle never change their longitudinal relation to the carriage-body but simply move inwardly, carrying with them the springs with which they are connected.

The rear central spring is fixed to a disk 45 having also the bars 44, which are pivoted to the disk and respectively mounted in the recessed inner faces of the blocks 46. These bars are mounted to swing forwardly so that the disk 45 will follow the rear block, 8, and by these means the rear central spring is connected to the body of the carriage. As the carriage folds the bars 44 will move outwardly and occupy the whole of the recesses in their respective blocks 46.

Fixed to the under side of each of the sections 1 and 2 of the axles is a brace-rod 19. These rods are extended inwardly from the axle-sections and have sleeves 20 rigid with their inner and elevated ends, which sleeves are slidable on the respective vertical portions of the four depending hangers 21, the hangers being secured to the under side of the carriage-body. The braces 19 move inwardly with the sections 1 and 2 of the axle as the carriage folds, and this movement is similar to that of the side springs when folding.

The carriage-body comprises, in addition to the hinged front portion, 17, the rear end portion, 18, the front portions, 22, and the rear portions, 23. One pair of side portions are provided with hinges 24 at one side by which they are enabled to swing laterally and with a fastening-loop 25 at the opposite side by means of which latter device the carriage is held extended. The front sections, 22, at each side have also a stud 26, which are respectively adapted to project into openings formed in the rear sections, 23. The left-hand stud is held by means of a set-screw $26^a$ passing through a bracket $26^b$ extending outwardly from the left side of the carriage-body. The side portions 22 and 23 are each formed with inwardly and horizontally projecting ledges 34 which are rigid with the respective side portions. Secured to the ledges of the sections 22 and 23 are L-shaped bolts 27, said bolts being pivotally connected to transversely-elongated strap-hinges 28, which extend across the under sides of the front and rear bottom sections 29 and 30, said sections being four in number and arranged in pairs, so that they may fold first on the longitudinal line and thence break at the middle and fold on the transverse hinge 24.

The front end sections, 17, are connected to the front side portions, 22, by means of hinges 31 which permit said sections to swing outward, as best shown in Figs. 4 and 5, the disk 16 and the hinge 47 serving to hingedly mount the two sections. The rear portions, 18, of the carriage-body are pivotally connected to each other by means of hinges 32 and to the rear side portions, 23, by means of arms 33, said arms being essentially hinges.

Reference to Figs. 7 and 8 will show that the extremities of the hinges 28 are formed with bends therein at points near the bolts 27, and by these means the sections 29 and 30 of the bottom of the body portion are placed in the same plane with the horizontal ledges 34 at the lower edges of the side portions 22 and 33, and also the parts are allowed to fold to a small size, as Fig. 8 shows.

The bottom sections, 29, have secured to their under sides and at their rear edges the plates $29^a$ which project rearwardly and are bent upwardly, as best shown in Fig. 9, so that they may engage the under sides of the respective bottom sections, 30, when the carriage is extended. The purpose of these devices is to assist in the support of the sections 30 when extended, and to raise said sections in unison with the sections 29, when the latter sections move upwardly in the folding operation.

A handle is provided for the carriage and consists of two bars 35, having at their lower extremities plates 36, which are enlarged at their free ends and provided with bolt-holes, and these plates are respectively secured to the rear extremities of the sections 1 and 2 of the rear axle. The upper ends of the bars 35 are bent rearwardly and horizontally, and one bar has hinged thereto a cross bar or handle portion 37, the free end of which is adapted to enter a socket 38, formed on the opposite bar 35 and which bar is provided with a swinging plate 39, adapted to fold down upon the free end of the cross-bar 37, when arranged within the socket 38, and the parts are held in this locked position by means of a pin 40 secured by a chain or other suitable device to the arm 35 which has the socket 38. Rigidly secured to and projecting forwardly from the bars 35 are cross-braces 41, each provided with a sleeve 42 adapted to slide on rods 43, rigidly secured to the rear ends of the side portions, 23, of the carriage-body.

In the manipulation of the carriage the folding is effected by first lifting the pin 40 from the socket 38, so that the handle-bar 37 may be released, as best shown in Fig. 11, whereupon by pushing forward the rear block, 8, the sections 3 and 4 of the rear axle will move rearwardly, causing the sections 1 and 2 to move inwardly, so that the said parts will assume the positions shown in Fig. 6. Simultaneously with this operation the sections 3 and 4 of the forward axle will swing forwardly with the block 8, moving the sections 1 and 2 inwardly, as Fig. 6 also illustrates. This folding operation of the axle will be concurrent with and productive of the folding of the body, which movement is effected by the rearward swinging of the sections 18 on the hinge 32, while the sections 17 at the front will fold outwardly on the disk 16 and hinge 47. The side portions 22 and 23 of the body will fold inward at the same time, and the bottom sections 29 and 30 will move upwardly on the longitudinal line at their center. The carriage will now be in a longitudinally-folded condition, as shown in Figs. 4 and 5.

To fold the carriage laterally, the set-screw 26ª and the loop 25 should be disconnected from the side portions 22 and 23, whereupon the whole carriage may be swung on the hinges 24, the axle-sections moving on the intermediate section, 12, which assumes a substantially transverse position, as shown in Fig. 10. It will thus be seen, and best by reference to Fig. 9, that the carriage will be folded into the smallest possible space and that it may be readily extended when it is to be used.

The operation of extending the carriage is effected by simply reversing the folding operation, and to do this the transversely-folded parts should first be extended longitudinally to occupy the positions shown in Fig. 5, whereupon the side portions 22 and 23 may be spread laterally, resulting in the downward movement of the bottom sections 29 and 30, which will extend the carriage to its operative adjustment.

Having thus described my invention, I claim as new and desire to secure by Letters Patent—

1. In a folding vehicle, the combination with a body capable of folding longitudinally and laterally, of axles formed of jointed sections, and a coupling extending longitudinally from one axle to the other and capable of folding laterally with the body portion of the vehicle, substantially as described.

2. In a vehicle, the combination of the running-gear, a spring-sustained body thereon, handles rising from the running-gear, and braces rigid on the handles and having a sliding connection with the body, substantially as described.

3. In a vehicle, the combination of the running-gear, a spring-sustained body thereon, a brace rigid with and rising from the running-gear and having a sleeve, and a bracket secured to the body and on which the sleeve moves, substantially as described.

4. In a folding vehicle, the combination with a running-gear, comprising an axle having a central block and sections pivoted thereto, of hinged body end portions, two recessed blocks fixed to the body near said end portions, a bar pivoted to swing in and out of each recessed block, said bars being pivoted to each other, and a spring fixed to the block of the axle, and to the bars at their point of connecting, substantially as described.

5. In a folding vehicle, a mounted body having jointed members connected to a disk, substantially as described.

6. In a folding vehicle, the combination of axles, a coupling between said axles, the coupling having a transverse hinge, and a folding body portion sustained on the axle, the body portion being capable of folding transversely, substantially as described.

7. In a folding vehicle, the combination of jointed axles, a coupling having a transverse hinge and connecting the axles, and a body portion sustained on the axles, the said body portion being capable of folding longitudinally and transversely, substantially as described.

8. In a folding vehicle, the combination of mounted axles, body side portions, body end portions, the said end portions comprising each two hinged sections capable of folding on vertical axes, and a bottom for the body portion to each side of which the body side portions are respectively hinged and the bottom being longitudinally divided and having a longitudinal hinge the bottom being capable of folding upwardly between the side portions and the side portions being capable of moving inward as the end portions swing, substantially as described.

9. In a folding vehicle, the combination with a body portion, of jointed axles, and a coupling connected to said axles, the same being composed of three jointed sections having limited swinging movement on each other, substantially as described.

10. In a folding vehicle, the combination with a body comprising end portions jointed and mounted to respectively swing forwardly and rearwardly, of jointed axles having portions capable of swinging forwardly in the folding operation, a spring mounted on each folding portion of the axles, the forward spring being connected to the forward end portions of the body, and two bars pivotally mounted beneath the rear portion of the body and connected to the rear spring, substantially as described.

GEORGE MAYER.

Witnesses:
JOHN E. KRAHMER,
ALANSON H. SCOTT.